(12) United States Patent
Lee et al.

(10) Patent No.: US 10,536,342 B2
(45) Date of Patent: Jan. 14, 2020

(54) NETWORK ESTIMATION

(71) Applicant: Microsoft Technology Licensing, LLC, Redmond, WA (US)

(72) Inventors: Alexandre Lee, Menlo Park, CA (US); Shipeng Yu, Sunnyvale, CA (US); Yan Liu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 15/850,910

(22) Filed: Dec. 21, 2017

(65) Prior Publication Data

US 2019/0199593 A1 Jun. 27, 2019

(51) Int. Cl.
| | | |
|---|---|---|
| *G06F 15/173* | (2006.01) | |
| *H04L 12/24* | (2006.01) | |
| *H04L 29/12* | (2006.01) | |
| *H04L 29/06* | (2006.01) | |
| *G06N 20/00* | (2019.01) | |

(52) U.S. Cl.
CPC ............. *H04L 41/12* (2013.01); *G06N 20/00* (2019.01); *H04L 41/50* (2013.01); *H04L 61/30* (2013.01); *H04L 63/102* (2013.01); *H04L 41/0893* (2013.01); *H04L 41/145* (2013.01); *H04L 41/16* (2013.01)

(58) Field of Classification Search
USPC ......................................................... 709/223
See application file for complete search history.

(56) References Cited

U.S. PATENT DOCUMENTS

| | | | | |
|---|---|---|---|---|
| 7,136,791 | B2* | 11/2006 | Darwent ................ | G06Q 10/10 703/6 |
| 9,384,571 | B1* | 7/2016 | Covell .................. | G06T 11/206 |
| 2012/0271722 | A1* | 10/2012 | Juan ....................... | G06Q 10/04 705/14.72 |
| 2014/0143329 | A1* | 5/2014 | Garg ..................... | H04L 67/306 709/204 |
| 2015/0163258 | A1* | 6/2015 | Garcia, III ............. | H04L 67/24 709/204 |
| 2017/0193451 | A1* | 7/2017 | Fang ....................... | G06F 16/93 |
| 2018/0336457 | A1* | 11/2018 | Pal ........................... | G06N 3/08 |

* cited by examiner

*Primary Examiner* — Anthony Mejia
(74) *Attorney, Agent, or Firm* — Schwegman Lundberg & Woessner, P.A.

(57) ABSTRACT

This disclosure relates to systems and methods for searching names using name clusters. A method includes training a supervised machine learning system to learn a connection strength between a member and peers of the member; clustering the member with the peers in response to a threshold number of profile similarities between the member and the peers and the connection strength between the member and the peers being above a connection strength threshold value; and applying an unsupervised machine learning system using output from the supervised machine learning system and the clustering to generate a connection between the member and at least one of the peers.

20 Claims, 9 Drawing Sheets

NETWORK ESTIMATION

TECHNICAL FIELD

The subject matter disclosed herein generally relates to network estimation and, more specifically, to estimating an organizational chart for an entity.

BACKGROUND

As use of modern technology increases, networking services are used for a wider variety of purposes. Members of various networks connect in different ways and interact with the network for various reasons. It would be beneficial to understand the internal organizational structure of an entity to determine to whom certain inquiries should be directed; however, such information is generally not publicly available.

BRIEF DESCRIPTION OF THE DRAWINGS

Some embodiments are illustrated by way of example and not limitation in the figures of the accompanying drawings.

DETAILED DESCRIPTION

Figure 1:
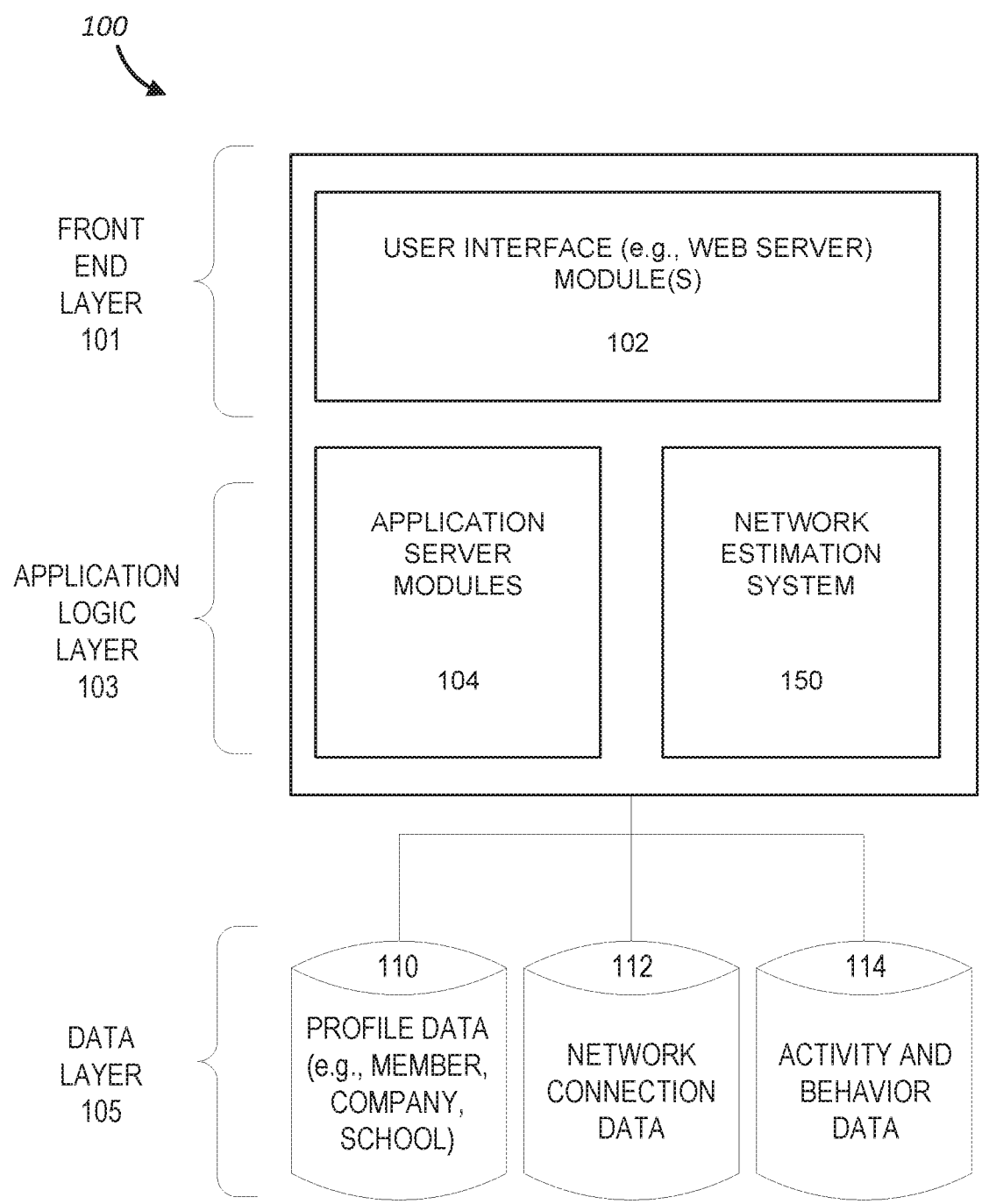
FIG. 1 is a block diagram illustrating various components or functional modules of an online social networking service, in an example embodiment.

The description that follows includes systems, methods, techniques, instruction sequences, and computing machine program products that embody the inventive subject matter. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In certain example embodiments, as members interact with other members and/or organizations at the online social networking service (e.g., connect with people, viewing profiles, reading articles published by certain members, recommending members, or the like), the members may not know which member of a target organization to contact for a specific inquiry (e.g., sales, marketing, product development, employment, or the like). Information regarding which members are responsible for which types of decisions (e.g., sales, purchasing, human resources, legal, etc.) may not be readily available outside the organization. Therefore, there is a technical problem of systems identifying correct members to whom certain inquiries should be directed or systems estimating an organizational structure according to a member's interactions with the online social networking service without having access to the private data for the organizational structure. In one example, the organizational structure is a hierarchy of employees for an entity, or a particular division of an entity.

To address this technical problem, a network estimation system (e.g., the network estimation system 150 of FIG. 1) is configured to train a supervised machine learning system to learn a connection strength between a member of an online social networking service and peers of the member of the online social networking service. The network estimation system then clusters the member with the peers in response to a threshold number of profile similarities between the member and the peers and the connection strength between the member and the peers being above a connection strength threshold value. The system then applies an unsupervised machine learning system using output from the supervised machine learning system and the clustering to generate a connection between the member and at least one of the peers. This output connection defines a connection between members of the online social networking service as well as the type of connection. For example, the connection may also indicate than one member manages another, works with another, or the like.

In other example embodiments, the network estimation system connects the member with the peer in a private organizational structure used by the member to represent a division of a common entity that employs the member and the peer. In one specific example, the estimated network is a network of salespersons, and the network estimation system 150 recommends a connection to one of the salespeople.

In one example embodiment, where the network estimation system 150 does have access to private organizational data, the network estimation system 150 validates the determined connection by determining whether the connection represents an actual connection in the private organizational data. In this way, the network estimation system 150 verifies the accuracy of the supervised machine learning system and the unsupervised machine learning system.

In other example embodiments, the network estimation system 150 provides an electronic user interface allowing the member to configure, manipulate, or edit an estimated organizational structure. In this way, each member may have separate network estimations of a division of an entity based, at least in part, on their own connections, experiences, or private information known by the member.

In one example embodiment, the various network estimations made with members of the online social networking service are kept private. Network estimation by one member may only be accessible by that member. Thus, generally, network estimations by various members are not collaborated, combined, or shared with other members.

In one specific example, given a sales lead for a corporate entity, the network estimation system 150 recommends surrounding co-workers (of the sales lead) with an expected accuracy exceeding 50% for major corporations (e.g., corporations with more than 100 employees) being members of the online social networking service. In this way, although a member may be in contact with another member in sales for a target organization, the network estimation system may more accurately indicate another member to whom a sales inquiry should be directed (e.g., a sales manager, etc.).

FIG. 1 is a block diagram illustrating various components or functional modules of an online social networking service 100, in an example embodiment. In one example, the online social networking service 100 includes a network estimation system 150 that performs many of the operations described herein.

A front end layer 101 consists of one or more user interface modules (e.g., a web server) 102, which receive requests from various client computing devices and communicate appropriate responses to the requesting client devices. In one example embodiment, the front end layer 101 provides an electronic interface allowing a member to identify a member as being part of an organizational structure. In another example embodiment, the front end layer 101 provides an electronic interface allowing a member to generate or edit an organizational structure. For example, the user interface module(s) 102 may receive requests in the form of Hypertext Transfer Protocol (HTTP) requests, or other web-based application programming interface (API) requests. In another example, the front end layer 101 receives requests or indicators from an application executing via a member's mobile computing device.

An application logic layer 103 includes various application server modules 104, which, in conjunction with the user interface module(s) 102, may generate various user interfaces (e.g., web pages, applications, etc.) with data retrieved from various data sources in a data layer 105. In one example embodiment, the application logic layer 103 includes the network estimation system 150 that is configured to perform many of the operations described herein.

In some examples, individual application server modules 104 may be used to implement the functionality associated with various services and features of the online social networking service 100. For instance, the ability of an organization to establish a presence in the social graph of the online social networking service 100, including the ability to establish a customized web page on behalf of an organization and to publish messages or status updates on behalf of an organization, may be services implemented in independent application server modules 104. Similarly, a variety of other applications or services that are made available to members of the online social networking service 100 may be embodied in their own application server modules 104. Alternatively, various applications may be embodied in a single application server module 104.

As illustrated, the data layer 105 includes, but is not necessarily limited to, several databases 110, 112, 114, such as a database 110 for storing profile data, including both member profile data and profile data for various organizations, name cluster data, member interactions, member queries, or the like. In one example embodiment, the database 114 stores member activity and behavior data, and the database 112 stores network connection data. In other example embodiments, a member privately generates a private organizational structure representing a division of an entity which is also stored in the database 112.

Consistent with some examples, when a person initially registers to become a member of the online social networking service 100, the person may be prompted to provide some personal information, such as his or her name, age (e.g., birthdate), gender, sexual orientation, interests, hobbies, contact information, home town, address, spouse's and/or family members' names, educational background (e.g., schools, majors, matriculation and/or graduation dates, etc.), occupation, employment history, skills, religion, professional organizations, and other properties and/or characteristics of the member. This information is stored, for example, in the database 110. Similarly, when a representative of an organization initially registers the organization with the online social networking service 100, the representative may be prompted to provide certain information about the organization. This information may be stored, for example, in the database 110, or another database (not shown).

The online social networking service 100 may provide a broad range of other applications and services that allow members the opportunity to share and receive information, which is often customized to the interests of the member. For example, in some examples, the online social networking service 100 may include a message sharing application that allows members to upload and share messages with other members. In other example embodiments, a sales navigator application assists members in identifying individuals that are responsible for sales decisions or other decisions. In some examples, members may be able to self-organize into groups, or interest groups, organized around subject matter or a topic of interest. In some examples, the online social networking service 100 may host various job listings providing details of job openings within various organizations.

As members interact with the various applications, services, and content made available via the online social networking service 100, information concerning content items interacted with, such as by viewing, playing, and the like, may be monitored, and information concerning the interactions may be stored, for example, as indicated in FIG. 1 by the database 114. In one example embodiment, the interactions are in response to receiving a message requesting the interactions.

Although not shown, in some examples, the online social networking service 100 provides an API module via which third-party applications can access various services and data provided by the online social networking service 100. For example, using an API, a third-party application may provide a user interface and logic that enables the member to submit and/or configure a set of rules used by the network estimation system 150. Such third-party applications may be browser-based applications or may be operating system specific. In particular, some third-party applications may reside and execute on one or more mobile devices (e.g., phones or tablet computing devices) having a mobile operating system.

Figure 2:
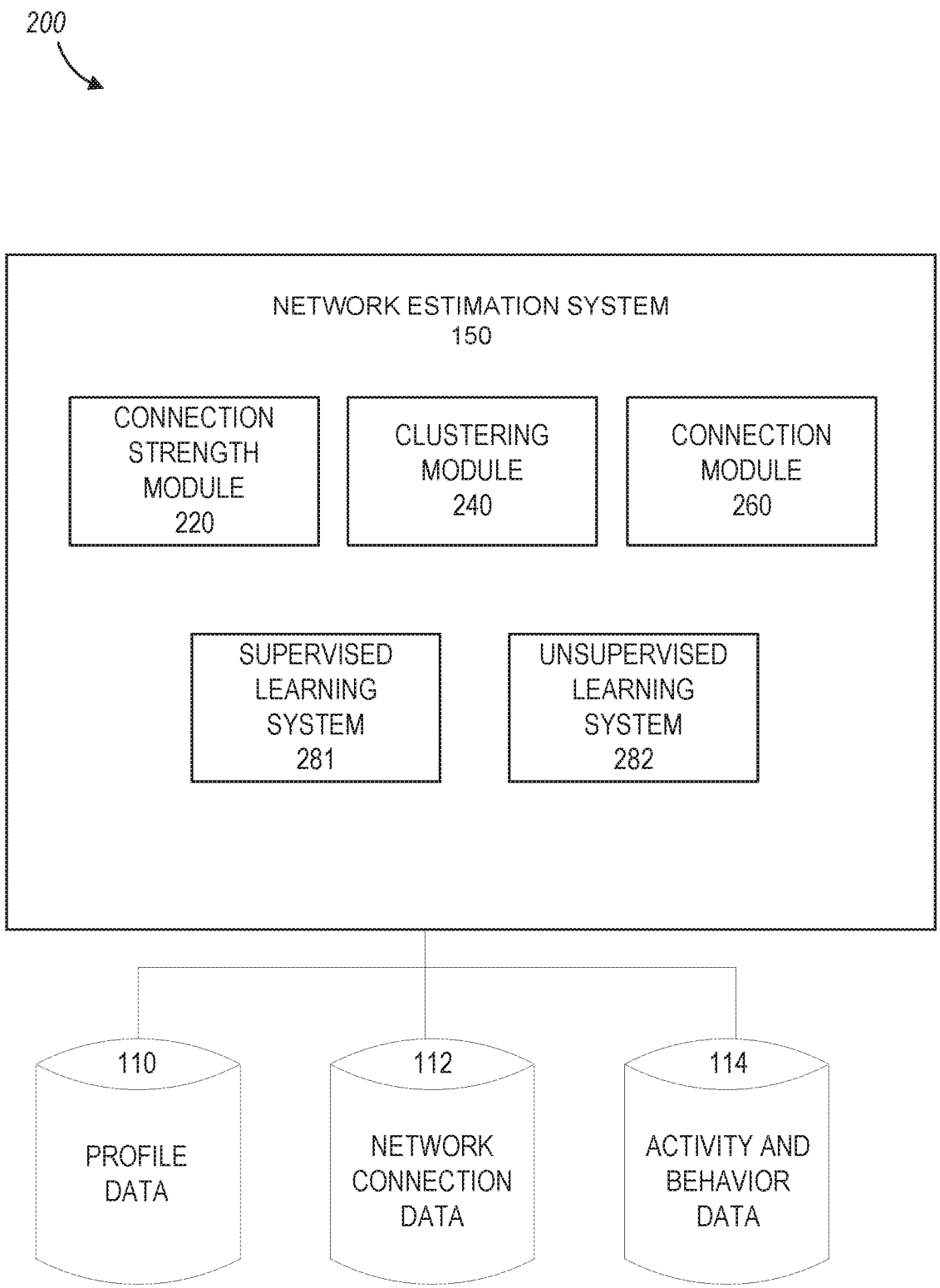
FIG. 2 is a block diagram illustrating a network estimation system, according to one example embodiment.

FIG. 2 is a block diagram illustrating a network estimation system 150, according to one example embodiment. In this example embodiment, the network estimation system 150 includes a connection strength module 220, a clustering module 240, a connection module 260, a supervised learning system 281, and an unsupervised learning system 282.

In one example embodiment, the connection strength module 220 is configured to train a supervised machine learning system 281 to learn a connection strength between a member of an online social networking service and peers of the member at the online social networking service, with the member and the peers being employed by a division of a common entity. In one example embodiment, the supervised machine learning system 281 is configured by an administrator of the network estimation system 150, and the connection strength module 220 executes the supervised machine learning system 281 according to how the supervised machine learning system 281 was configured by the administrator.

As described herein, a supervised machine learning system is a system configured to perform a machine learning task of inferring a relationship from labeled training data. In this example, training data at least includes profile data for members of the online social networking service, and the inferred relationship is a connection strength between a member and peers of the member. In certain example embodiments, connection strength includes a connection closeness (e.g., a minimum number of connections between the member and peers of the member). In one example, peers at least include other employees employed with the member in a division of an entity (e.g., salespersons for a specific product) performing a similar task (e.g., on the same team).

In supervised learning, each example is a pair consisting of an input object (e.g., a profile parameter) and a desired output value (e.g., a connection strength). A supervised learning algorithm analyzes the training data and produces an inferred function (e.g., a mapping between member data similarities and a connection strength between the members), which can be used for mapping profile data similarities to connection strengths.

In one example, a member data field is "co-viewing another member's profile." For example, one input to the supervised machine learning system 281 is whether the member and the member's peer have each viewed the profile for another member.

Another member data field that may be an input to the supervised machine learning system 281 is title similarities between members. In one example, a member and a member's peer are both "salesmen" and are both employed by the same division of a corporate entity.

Another member data field that may be an input to the supervised machine learning system 281 is profile similarity score. In one example, as members use similar terms to summarize their experience (e.g., x number of years writing code in C++), graduated from the same school, did similar research, worked on projects together, have similar hobbies, are members of a family, or any other similarities in profile data, these similarities may be inputs to the supervised machine learning system 281.

Another member data field that may be an input to the supervised machine learning system 281 is "seniority differential." For example, where one member has 20 years more experience than another, the seniority differential may be the number of years difference. In other examples, seniority is the number of years currently employed by the entity.

Another member data field that may be an input to the supervised machine learning system 281 is a decision-maker score. In one example embodiment, as a member has indicated the authority to make decisions, the member receives a higher decision maker score. In other examples, a member receives a higher decision-maker score when including "manager," "supervisor," or other types of term in a title, frequently receiving inquiries (e.g., sales contacts, etc.), or other activities at the online social networking service. Further examples and description of a decision-maker score is further described in previously filed U.S. patent application Ser. No. 14/501,787 filed Sep. 30, 2014.

In other examples, where a member directs requests for a decision to other members, the member receives a lower decision-maker score. In one example, the decision-maker score is scaled to be between 0 and 1, but of course, this is not necessarily the case. In other example embodiments, as the member agrees to conditions with other members using the online social networking service, those agreements increase the member's decision-maker score.

Another member data field that may be an input to the supervised machine learning system 281 is connection co-invites. For example, as two members both invite the same other member to connect with them, the fact that these members have both invited the same other member to connect with them is included as an input into the supervised machine learning system 281.

Another member data field that may be an input to the supervised machine learning system 281 is activities using a specific application. In one example embodiment, the online social networking service 100 provides an application designated to a specific purpose (e.g., sales, human resources, legal, etc.) and a member's use of this particular application is tracked. In one example, profile data for members includes their usage patterns (frequency, similar activities, etc.), and these similarities are fed into the supervised machine learning system 281. In certain examples, usage patterns includes button presses, feature uses, selections, usage frequency, or the like.

In one example embodiment, the connection strength module 220 learns a connection strength between members of the online social networking service by training the supervised machine learning system 281 using profile data 110 and activity and behavior data 114. The connection strength module 220 then applies the supervised machine learning system 281 to other members to determine connection strengths for peers of other members.

In one specific example, the connection strength module 220 trains on member's interaction data having access to how those members are actually connected. Having access to the database 112 allows the supervised machine learning system 281 to train on known members using this known data to train and verify the supervised machine learning system 281.

In another example embodiment, the strength module 220 increases a connection strength between peers in response to a member sending a message to the peers within a threshold period of time. For example, in response to the member sending messages to two separate peers within an hour time period, the strength module 220 increases the connection strength between the peers.

In one example embodiment, the clustering module 240 is configured to cluster the member with the peers in response to a threshold number of profile similarities between the member and the peers. In one example, the threshold number of profile similarities is seven. In another example, the clustering module 240 clusters a top threshold number of peers with the member (e.g., the top seven peers having the most similarities). In certain examples, clustering the members at least includes grouping the members by flagging the member indicating that they are members of the cluster. In another example embodiment, clustering at least includes storing the members in a common table in a database of member clusters.

In another example embodiment, the clustering module 240 considers profile similarities as well as the connection strength being above a connection strength threshold value in determining whether to cluster the member with the member's peers.

In these ways, instead of building a specific organizational chart for a foreign organization, the network estimation system 150 determines related colleagues of a member of the online social networking system 100 who is employed by the organization. In one example, the network estimation system 150 determines "managers" in a particular division of a corporate entity. In another example, the network estimation system 150 determines "supervisors" or "engineers" in a particular department. The clustering module 240 also clusters employees that likely work together on similar projects, or the like. In another specific example, the clustering module 240 clusters decision-makers based, at least in part, on a decision-maker score.

In one example embodiment, the connection module 260 is configured to apply an unsupervised machine learning system 282 using output from the supervised machine learning system 281 and the clustering to generate a connection between the member and at least one of the peers. In one example, the supervised machine learning system 281 identifies a specific member as a likely peer of a member. In another example embodiment, the supervised machine learning system 282 outputs a set of peers that are likely peers of the member.

As described herein, an unsupervised machine learning system 282 at least includes a machine that is configured to infer a function to describe hidden structure from unlabeled data. As one skilled in the art may appreciate, the unsupervised machine learning system 282 may be configured to generate a connection and learn whether the generated connections are acceptable based, at least in part, on whether the member accepts the recommended connection as part of the member's private network estimation.

In one example embodiment, a member desires to contact a member of an entity that is represented on the online social networking service 100. In response, the network estimation system 150 recommends a peer of the targeted member instead of the member. Also, the network estimation system 150 may recommend the peer in response to the peer having a higher decision-maker score than the member of the entity. Similarly, the network estimation system 150 may identify one of the peers of the targeted member as a sales contact for the common entity in response to the peer having a higher decision-maker score than the member.

In other example embodiment, the network estimation system 150 provides an electronic interface allowing a member to provide a different connection recommendation than the connection generated by the network estimation system 150. In response, the network estimation system 150 applies the connection to the member's private network estimation. In one example embodiment, the network estimation system 150 generates a web page that is transmitted to a computer device for the member. In another example embodiment, the network estimation system 150 electronically transmits the data needed to generate the user interface to an application executing on the member's client device.

In one example embodiment, the network estimation system 150 provides an electronic interface requesting that the member identify a relationship to a peer. In one example, as a member provides a recommendation for another member, the user interface may also request that the member identify the relationship between the member and the member being recommended.

In another example embodiment, the network estimation system 150 displays a button on a user interface being used by a member communicating with an entity. In response to a member pressing the button, the network estimation system 150 displays one or more members that are identified as decision makers.

In other example embodiments, the network estimation system 150 identifies relationship selected from managing, supervising, direct reporting, peer, co-workers, reporting chain, or the like.

In another example embodiment, the network estimation system combines private network estimations from members of the same entity. In this way, as two separate members employed by entity A construct network estimations for entity B, the network estimation system 150 may combine the two network estimations and update each member's private network estimations. Thus, the two members may cooperate to estimate a network at a foreign entity. In this example embodiment, the network estimation system 150 does not share private network estimations with other entities.

In another example embodiment, the network estimation system 150 provides access to a single estimated network structure that many members of an entity may share. Thus, many members of a particular entity may cooperate in generating a common estimated network structure.

Figure 3:
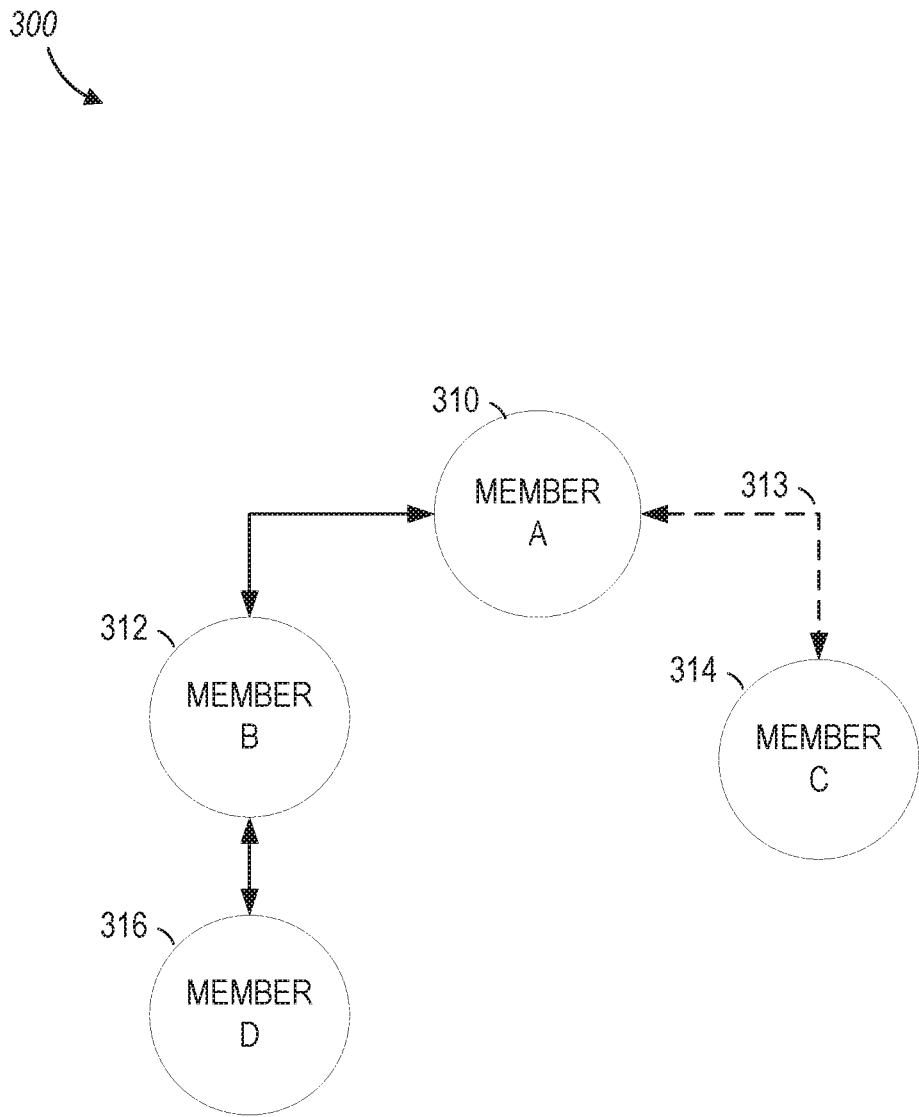
FIG. 3 is a block diagram illustrating an estimated organizational structure, according to one example embodiment.

FIG. 3 is a block diagram illustrating an estimated organizational structure 300, according to one example embodiment. The estimated organizational structure 300 includes member A 310, member B 312, and member D 316.

As described herein, the network estimation system 150 determines that member C 314 is a closely related colleague and likely works under member A 310 (e.g., Member A 310 is a supervisor and member C 314 is a subordinate with member B 312). In this particular example, the network estimation system 150 recommends connection 313. In one example embodiment, the network estimation system 150 displays the organizational structure 300 using an electronic interface by generating a web page and transmitting the web page, using a network interface, to a client device for the member.

In another example embodiment, the network estimation system 150 transmits the organizational structure 300 to the member's client device for display using a customized application executing at the client device.

As previously described, the estimated organizational structure may or may not accurately reflect how members are connected in the real world; however, as the accuracy of the supervised machine learning system 281 and the unsupervised machine learning system 282 increase, so the generated connection recommendations will statistically be more likely to reflect reality.

Figure 4:
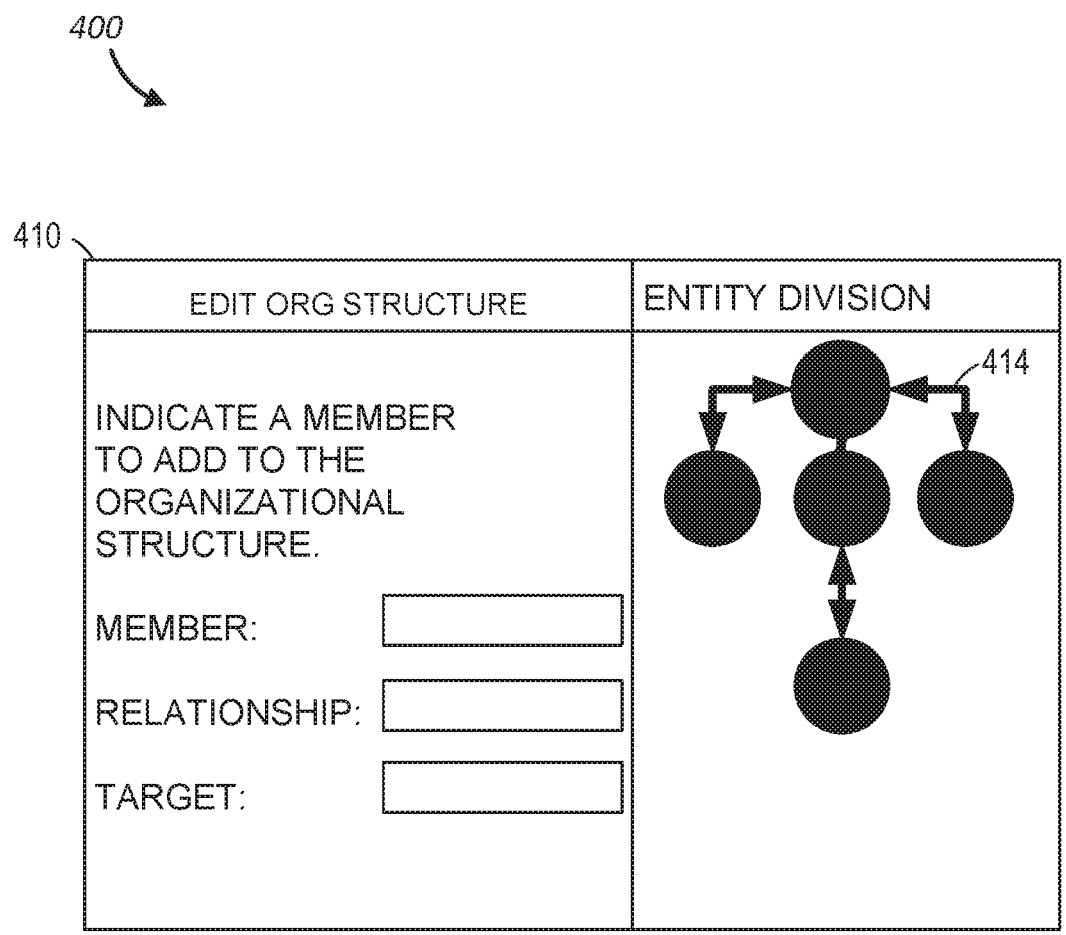
FIG. 4 is a block diagram illustrating an electronic user interface, according to one example embodiment.

FIG. 4 is a block diagram illustrating an electronic user interface 400, according to one example embodiment. In one example embodiment, the user interface 400 displays, in a window 410, instructions, a member to add, a relationship, and a target member to connect to.

In another example embodiment, the network estimation system 150 generates an electronic user interface that allows a member to graphically generate the estimated organizational structure 414. For example, the member may select members, draw connection lines, indicate relationships, and perform other graphical manipulations of the estimated organizational structure 414.

Figure 5:
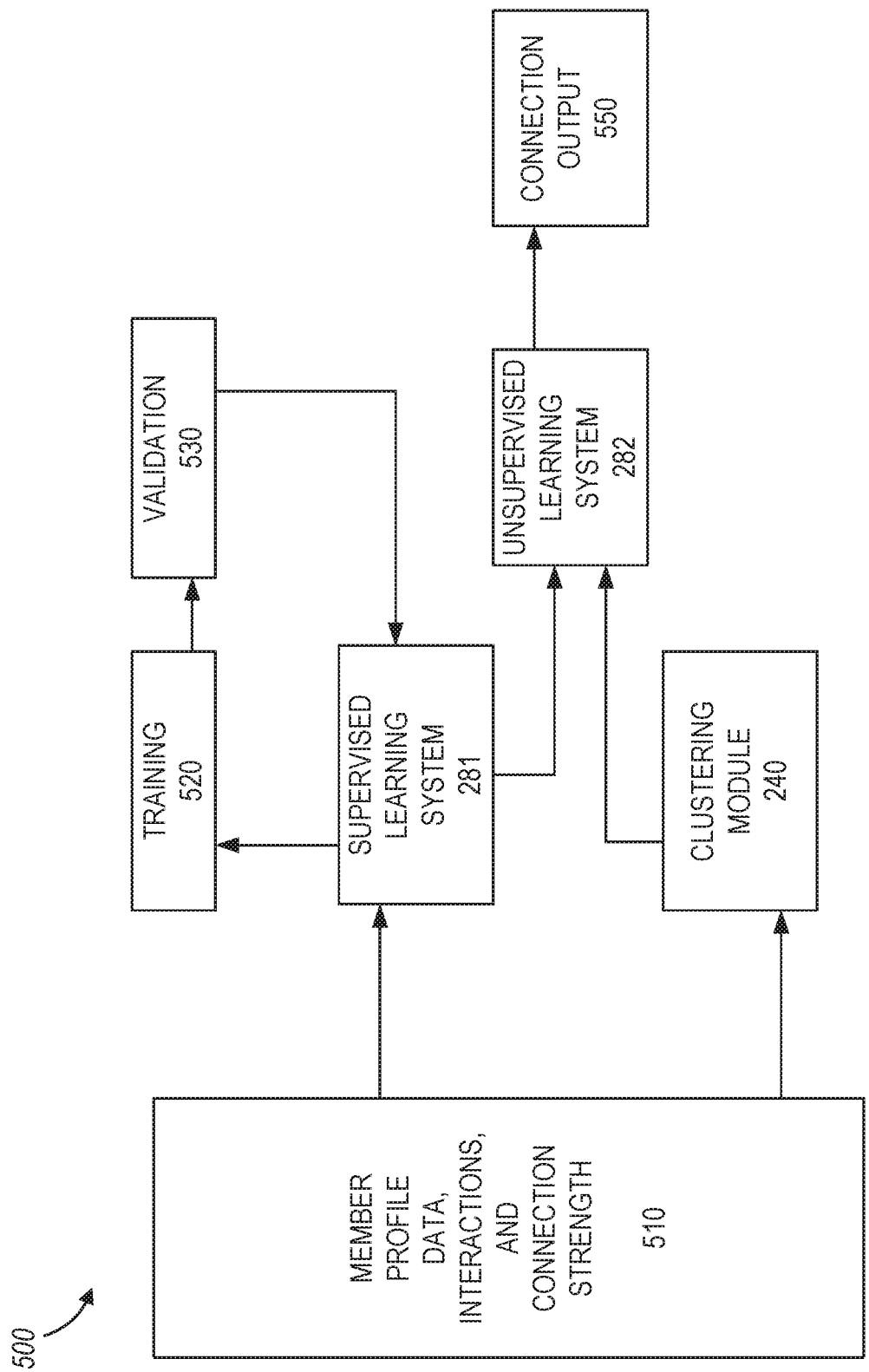
FIG. 5 is a data flow diagram illustrating one example embodiment of a network estimation system.

FIG. 5 is a data flow diagram illustrating one example embodiment of a network estimation system 150. In this example embodiment, the supervised learning system 281 receives, as inputs, member profile data, interactions, and a connection strength 510. The profile data are stored in the profile database 110 and the interactions are stored in the activity and behavior database 114.

As previously described, the member profile parameters include at least one, but may include all, of the following: profile co-views, title similarities, profile similarity score (e.g., considering all profile parameters), a seniority differential, a decision-maker score, connection co-invites, activities using a customized application, or the like.

In one example embodiment, the supervised learning system 281 trains 520 on known member data and validates 530 the configuration of the supervised learning system 281. In another example embodiment, the supervised learning system 281 is trained and executes on the input 510 and outputs a value to the unsupervised learning system 282.

Furthermore, the clustering module 240 generates a set of peers for a specific member of the online social networking service according to the connection strength between the peers. Then, results from the supervised learning system 281 and the clustering module 240 are fed into the unsupervised learning system 282, and the unsupervised learning system 282 outputs a proposed connection 550 to be added to an estimated organizational structure as described herein.

Figure 6:
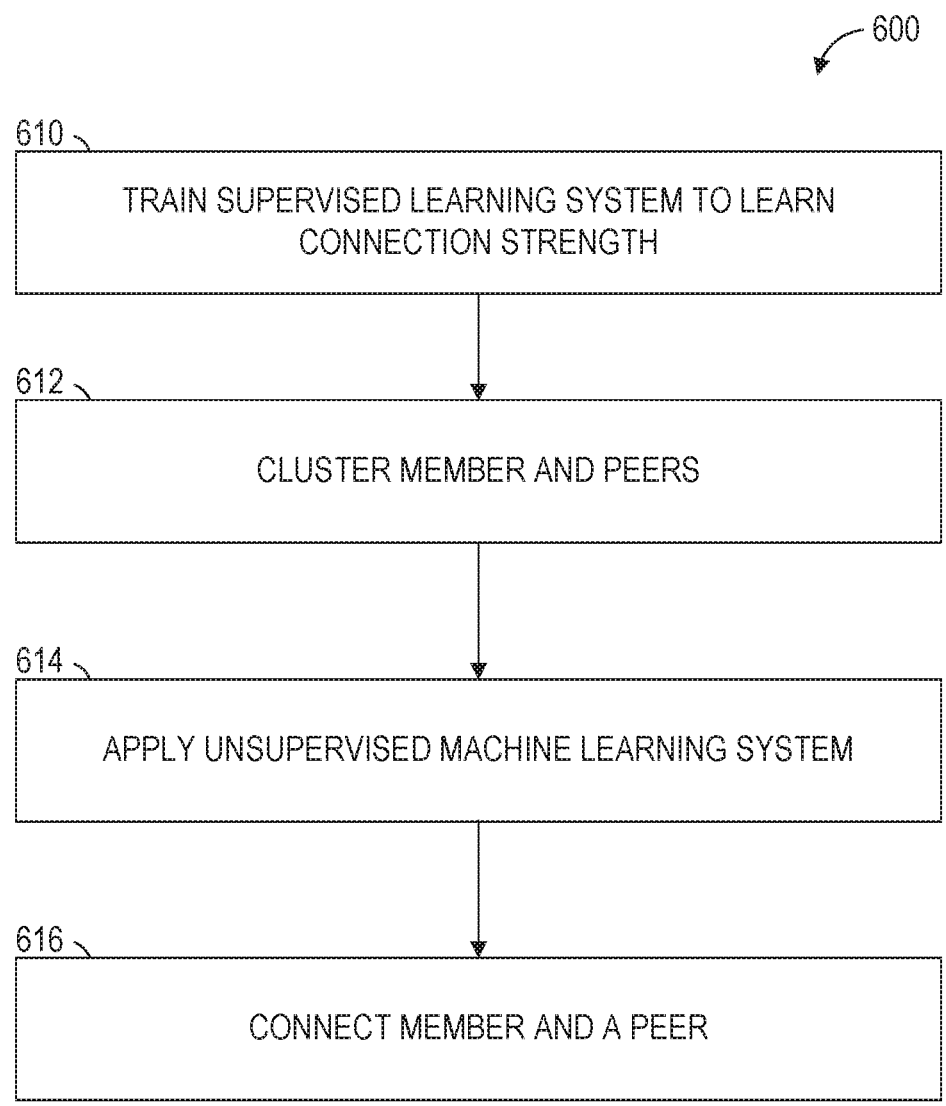
FIG. 6 is a flow chart diagram depicting one method of estimating an organizational structure, according to one example embodiment.

FIG. 6 is a flow chart diagram depicting one method 600 of estimating an organizational structure, according to one example embodiment. Operations in the method may be performed by modules described in FIG. 2 and are described by reference thereto.

In one example embodiment, the method 600 begins and at operation 610, the connection strength module trains a supervised machine learning system to learn a connection strength between a member of an online social networking service and peers of the member at the online social networking service. In another example embodiment, the member and the peers are employed by a division of a common entity. For example, the member and the peers may each be employed by a sales division of a manufacturing business.

The method 600 continues and at operation 612, the clustering module 240 clusters the member with the peers in response to a threshold number of profile similarities between the member and the peers, and the connection strength between the member and the peers being above a connection strength threshold value. For example, where a connection strength is scaled between 0 and 1, the connection strength threshold value may be 0.8; however, this is not necessarily the case. In other embodiments, an administrator of the network estimation system 150 may adjust the connection strength threshold value or provide a new value.

The method 600 continues and at operation 614, the connection module 260 applies an unsupervised machine learning system, as one skilled in the art may appreciate, and uses output from the supervised machine learning system and the clustering to generate a connection between the member and at least one of the peers. The method 600 continues and at operation 616 with the connection module 260 connecting, at the online social networking service, the member with the at least one peer in an estimated organizational structure representing a division of the common entity.

Figure 7:
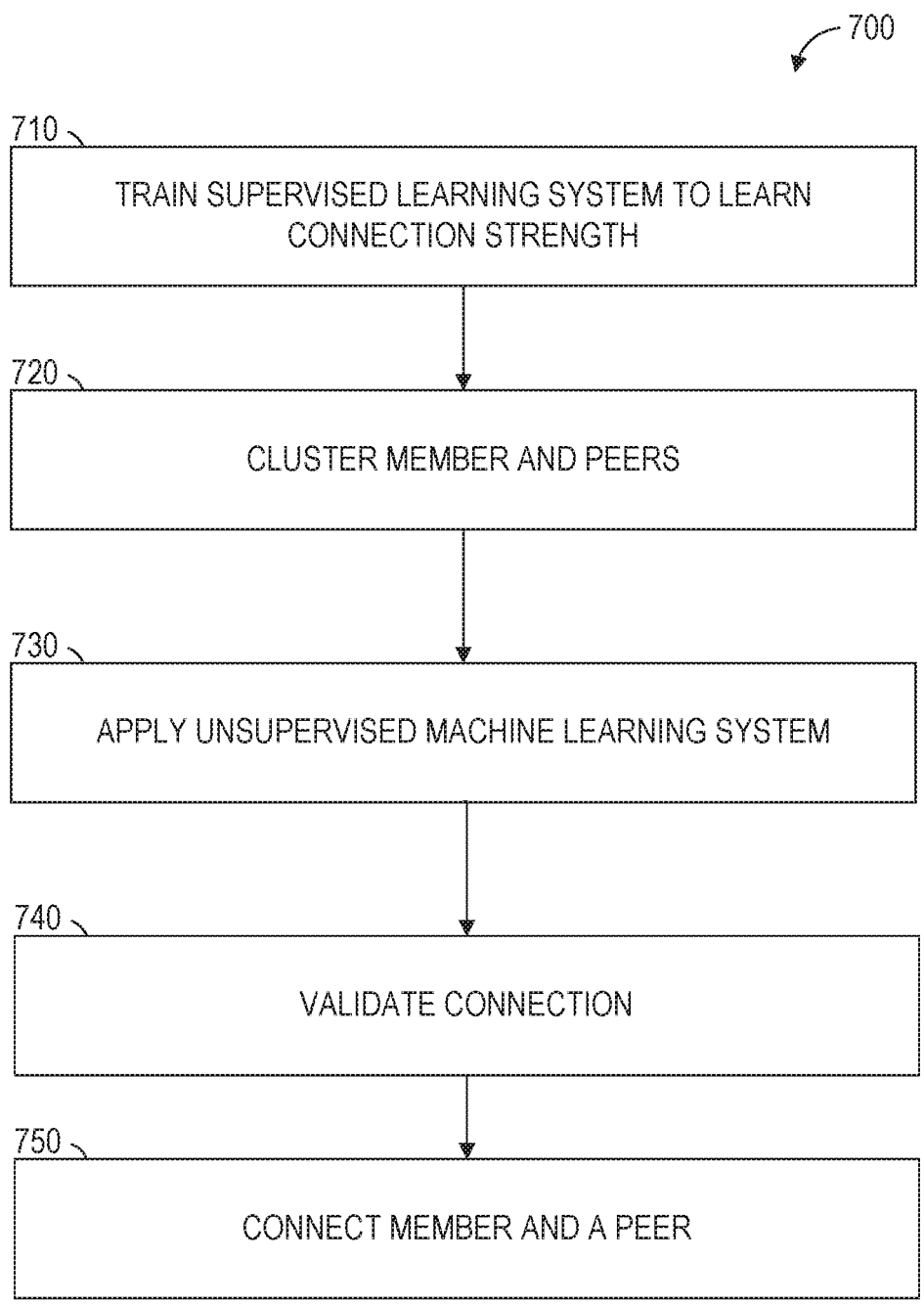
FIG. 7 is flow chart diagram depicting another method of estimating an organizational structure, according to an example embodiment.

FIG. 7 is flow chart diagram depicting another method 700 of estimating an organizational structure, according to an example embodiment. Operations in the method 700 may be performed by modules described in FIG. 2 and are described by reference thereto.

In one example embodiment, the method 700 begins and at operation 710, the connection strength module trains a supervised machine learning system to learn a connection strength between a member of an online social networking service and peers of the member at the online social networking service.

The method 700 continues and at operation 720, the clustering module 240 clusters the member with the peers in response to a threshold number of profile similarities between the member and the peers and the connection strength between the member and the peers being above a connection strength threshold value.

The method 700 continues and at operation 730, the connection module 260 applies an unsupervised machine learning system 282, as one skilled in the art may appreciate, and uses output from the supervised machine learning system 281 and the clustering to generate a connection between the member and at least one of the peers.

The method 700 continues and at operation 740, the connection module 260 validates the connection by determining whether the connection is found in a valid organizational chart for the division of the entity. In response to not finding the connection in a valid organizational chart for the division, the connection module 260 may perform additional training on the supervised machine learning system 281. The method 700 continues and at operation 750 with the connection module 260 connecting, at the online social networking service, the member with the at least one peer in an estimated organizational structure representing a division of the common entity.

Figure 8:
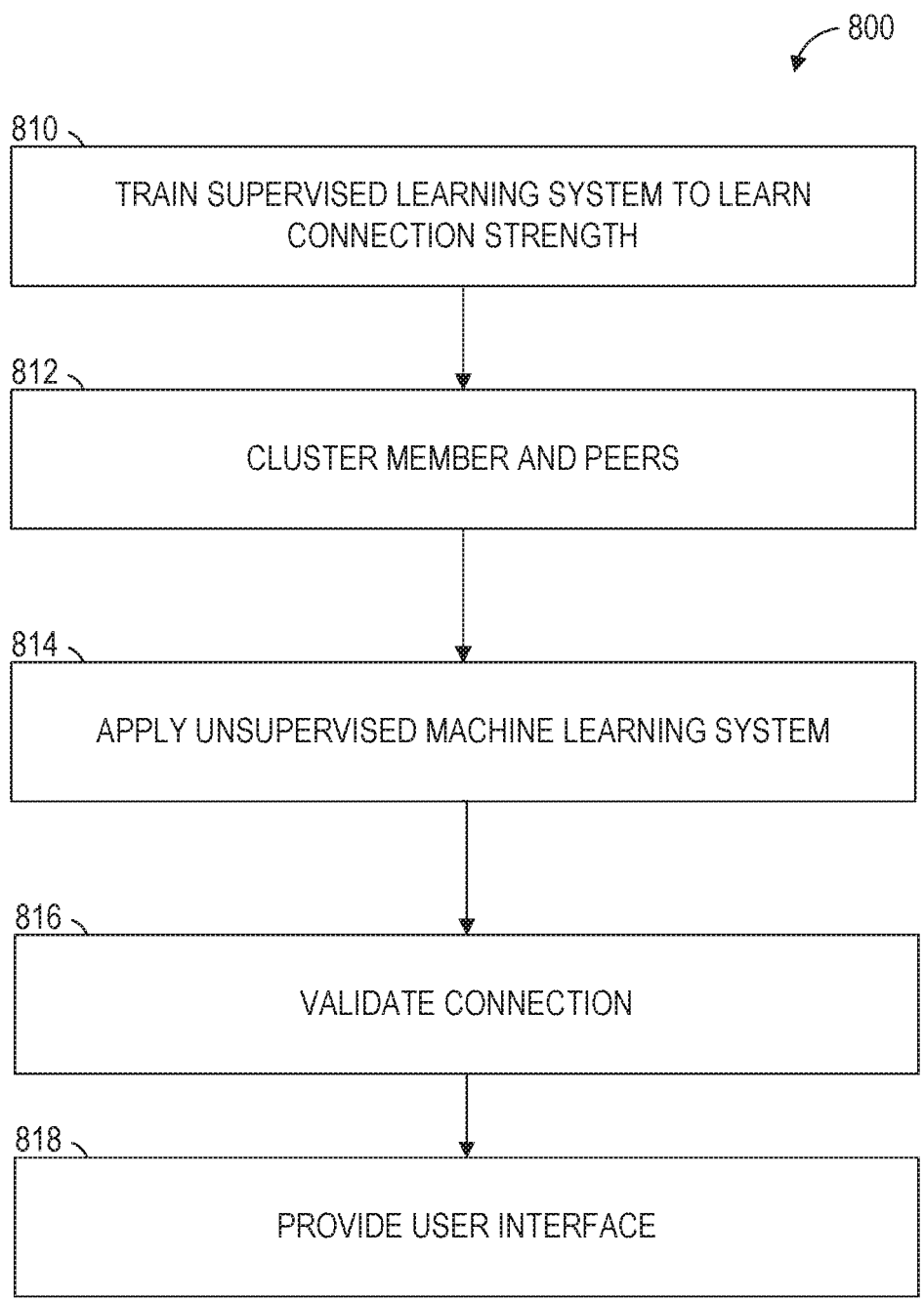
FIG. 8 is a flow chart diagram depicting one method of estimating an organizational structure, according to another example embodiment.

FIG. 8 is a flow chart diagram depicting one method 800 of estimating an organizational structure, according to another example embodiment. Operations in the method 800 may be performed by modules described in FIG. 2 and are described by reference thereto.

In one example embodiment, the method 800 begins and at operation 810, the connection strength module 220 trains a supervised machine learning system 281 to learn a connection strength between a member of an online social networking service 100 and peers of the member at the online social networking service 100.

The method 800 continues and at operation 812, the clustering module 240 clusters the member with the peers in response to a threshold number of profile similarities between the member and the peers and the connection strength between the member and the peers being above a connection strength threshold value.

The method 800 continues and at operation 814, the connection module 260 applies an unsupervised machine learning 282 system, as one skilled in the art may appreciate, and uses output from the supervised machine learning system 281 and the clustering to generate a connection between the member and at least one of the peers.

The method 800 continues and at operation 816, the connection module 260 validates the connection by determining whether the connection is found in a valid organizational chart for the division of the entity. The method 800 continues and at operation 818, the connection module 260 provides a user interface as described herein. In certain examples, the connection module 260 generates an electronic user interface and transmits the user interface to a client device being used by the member. In another example embodiment, the connection module 260 causes an application executing on the member's client device to display the user interface.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-8 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 9:
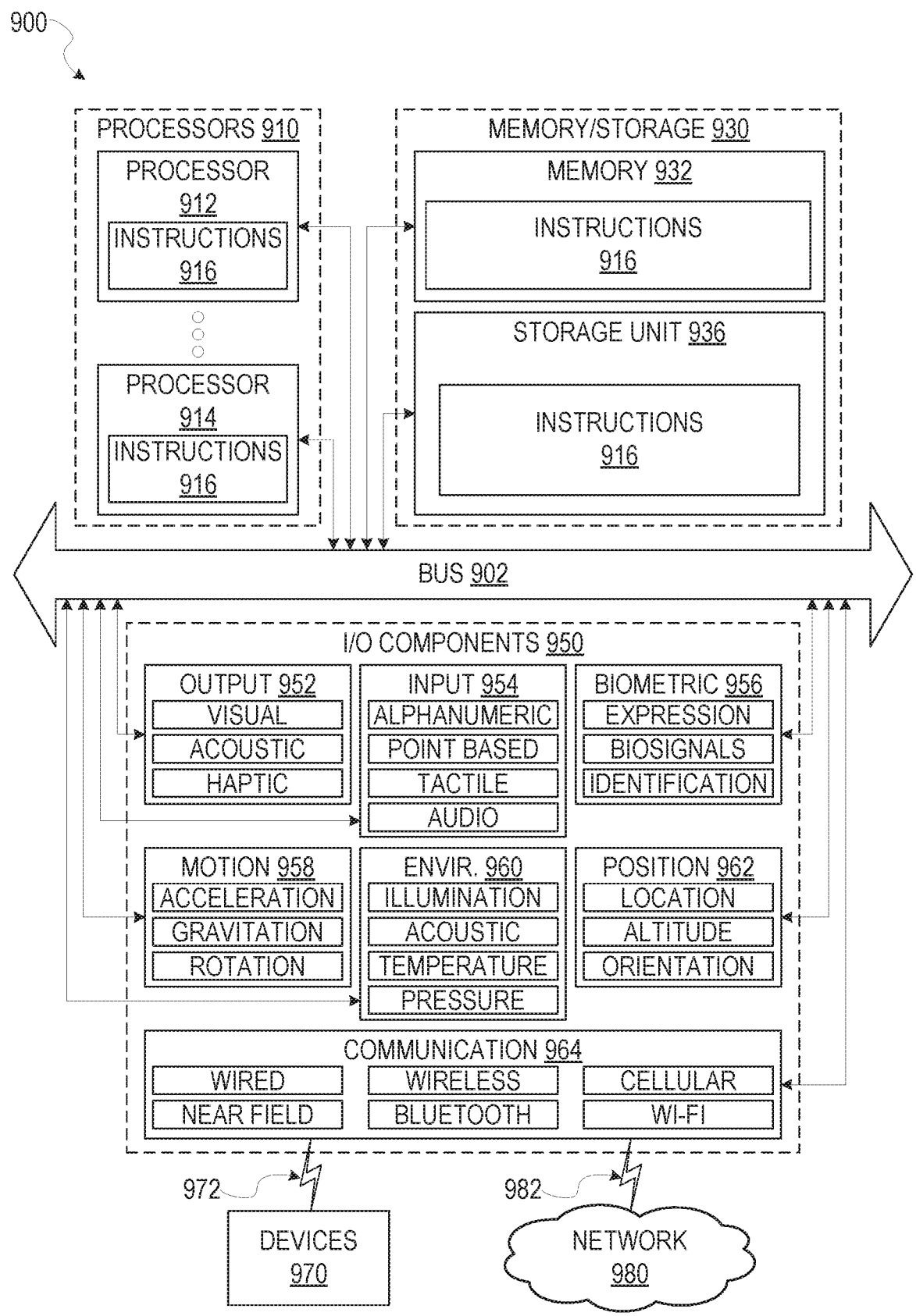
FIG. 9 is a block diagram illustrating components of a machine, according to some example embodiments, able to read instructions from a machine-readable medium (e.g., a machine-readable storage medium) and perform any one or more of the methodologies discussed herein

FIG. 9 is a block diagram illustrating components of a machine 900, according to some example embodiments, able to read instructions from a machine-readable medium (e.g., a machine-readable storage medium) and perform any one or more of the methodologies discussed herein.

Specifically, FIG. 9 shows a diagrammatic representation of a machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagrams of FIGS. 6-8. Additionally, or alternatively, the instructions 916 may implement one or more of the components of FIG. 2. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and input/output (I/O) components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972, respectively. For example, the communication components 964 may include a network interface component or other suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more computer processors; and
one or more computer-readable mediums storing instructions that are executed by the one or more computer processors to perform operations comprising:
training a supervised machine learning system based on a set of labeled training data, yielding a trained supervised machine learning system, the set of labeled training data including profile data for a first set of member profiles of an online social networking service and labels indicating connection strengths among the member profiles included in the first set of member profiles, the trained supervised machine learning system outputting a connection strength value indicating an estimated strength of connection between two member profiles provided as input to the trained supervised machine learning system;
providing member profile data for a second set of member profiles of the online social networking service as input into the trained supervised machine learning system, yielding a set of connection strength values for the second set of member profiles, the second set of member profiles including member profiles employed by a common entity, the set of connection strength values indicating estimated strengths of connection between a first member profile from the second set of member profiles and the other member profiles from the second set of member profiles;
clustering the first member profile with a first subset of the other member profiles in response to determining that a threshold number of profile similarities exist between the first member profile and the first subset of the other member profiles, and that the connection strength values between the first member profile and the first subset of the other member profiles exceeds a connection strength threshold value;
applying an unsupervised machine learning system using the set of connection strength values and the clustering to generate a connection between the first member profile and at least one member profile from the first subset of the other member profiles; and
connecting, at the online social networking service, the first member profile with the at least one member profile from the first subset of the other member profiles in an organizational structure representing a first division of the common entity.

2. The system of claim 1, the operations further comprising:
indicating the connection to a second member of the online social networking service in response to the second member requesting to contact the common entity, the second member not being employed by the common entity.

3. The system of claim 2, the operations further comprising:
identifying the at least one member profile from the subset of the other member profiles as a sales contact for the common entity.

4. The system of claim 1, the operations further comprising:
validating the connection by verifying existence of the connection in an official organizational chart for the common entity.

5. The system of claim 1, wherein the profile similarities are viewing a member profile, title similarities, profile similarity scores, seniority difference, decision-maker score, connection co-invites, and interaction similarities with the online social networking service.

6. The system of claim 1, the operations further comprising:
providing an electronic user interface allowing the first member profile to provide other connection recommendations for the organizational structure.

7. The system of claim 1, the operations further comprising:
providing an electronic user interface requesting that the first member profile identify a relationship to one of the member profiles from the first subset of other member profiles, wherein the connection is further based on an explicit indication from the first member profile.

8. A method comprising:
training a supervised machine learning system based on a set of labeled training data, yielding a trained supervised machine learning system, the set of labeled training data including profile data for a first set of member profiles of an online social networking service and labels indicating connection strengths among the member profiles included in the first set of member profiles, the trained supervised machine learning system outputting a connection strength value indicating an estimated strength of connection between two member profiles provided as input to the trained supervised machine learning system;
providing member profile data for a second set of member profiles of the online social networking service as input into the trained supervised machine learning system, yielding a set of connection strength values for the second set of member profiles, the second set of member profiles including member profiles employed by a common entity, the set of connection strength values indicating estimated strengths of connection between a first member profile from the second set of member profiles and the other member profiles from the second set of member profiles;
clustering the first member profile with a first subset of the other member profiles in response to determining that a threshold number of profile similarities exist between the first member profile and the first subset of the other member profiles, and that the connection strength values between the first member profile and the first subset of the other member profiles exceeds a connection strength threshold value;
applying an unsupervised machine learning system using the set of connection strength values and the clustering to generate a connection between the first member profile and at least one member profile from the first subset of the other member profiles; and
connecting, at the online social networking service, the first member profile with the at least one member profile from the first subset of the other member profiles in an organizational structure representing a first division of the common entity.

9. The method of claim 8, further comprising:
indicating the connection to a second member of the online social networking service in response to the second member requesting to contact the common entity, the second member not being employed by the common entity.

10. The method of claim 9, further comprising:
identifying the at least one member profile from the subset of the other member profiles as a sales contact for the common entity.

11. The method of claim 8, further comprising:
validating the connection by verifying existence of the connection in an official organizational chart for the common entity.

12. The method of claim 8, wherein the profile similarities are viewing a member profile, title similarities, profile similarity scores, seniority difference, decision-maker score, connection co-invites, and interaction similarities with the online social networking service.

13. The method of claim 8, further comprising:
providing an electronic user interface allowing the first member profile to provide other connection recommendations for the organizational structure.

14. The method of claim 8, further comprising:
providing an electronic user interface requesting that the first member profile identify a relationship to one of the member profiles from the first subset of other member profiles, wherein the connection is further based on an explicit indication from the first member profile.

15. A non-transitory computer-readable medium storing instructions that are executed by one or more computer processors to perform operations comprising:
training a supervised machine learning system based on a set of labeled training data, yielding a trained supervised machine learning system, the set of labeled training data including profile data for a first set of member profiles of an online social networking service and labels indicating connection strengths among the member profiles included in the first set of member profiles, the trained supervised machine learning system outputting a connection strength value indicating an estimated strength of connection between two member profiles provided as input to the trained supervised machine learning system;
providing member profile data for a second set of member profiles of the online social networking service as input into the trained supervised machine learning system, yielding a set of connection strength values for the second set of member profiles, the second set of member profiles including member profiles employed by a common entity, the set of connection strength values indicating estimated strengths of connection between a first member profile from the second set of member profiles and the other member profiles from the second set of member profiles;
clustering the first member profile with a first subset of the other member profiles in response to determining that a threshold number of profile similarities exist between the first member profile and the first subset of the other member profiles, and that the connection strength values between the first member profile and the first subset of the other member profiles exceeds a connection strength threshold value;
applying an unsupervised machine learning system using the set of connection strength values and the clustering to generate a connection between the first member profile and at least one member profile from the first subset of the other member profiles; and
connecting, at the online social networking service, the first member profile with the at least one member profile from the first subset of the other member profiles in an organizational structure representing a first division of the common entity.

16. The non-transitory computer-readable medium of claim 15, the operations further comprising:
indicating the connection to a second member of the online social networking service in response to the second member requesting to contact the common entity, the second member not being employed by the common entity.

17. The non-transitory computer-readable medium of claim 16, the operations further comprising:
identifying the at least one member profile from the subset of the other member profiles as a sales contact for the common entity.

18. The non-transitory computer-readable medium of claim 15, the operations further comprising:
validating the connection by verifying existence of the connection in an official organizational chart for the common entity.

19. The non-transitory computer-readable medium of claim 15, wherein the profile similarities are viewing a member profile, title similarities, profile similarity scores, seniority difference, decision-maker score, connection co-invites, and interaction similarities with the online social networking service.

20. The non-transitory computer-readable medium of claim 15, the operations further comprising:
providing an electronic user interface allowing the first member profile to provide other connection recommendations for the organizational structure.

* * * * *